United States Patent
Allen et al.

(10) Patent No.: US 10,108,602 B2
(45) Date of Patent: *Oct. 23, 2018

(54) DYNAMIC PORTMANTEAU WORD SEMANTIC IDENTIFICATION

(71) Applicant: International Business Machines Corporation, Armonk, NY (US)

(72) Inventors: Corville O. Allen, Morrisville, NC (US); Albert A. Chung, Cary, NC (US); Andrew R. Freed, Cary, NC (US); Sorabh Murgai, Cary, NC (US)

(73) Assignee: International Business Machines Corporation, Armonk, NY (US)

( * ) Notice: Subject to any disclaimer, the term of this patent is extended or adjusted under 35 U.S.C. 154(b) by 0 days.

This patent is subject to a terminal disclaimer.

(21) Appl. No.: 15/687,503

(22) Filed: Aug. 27, 2017

(65) Prior Publication Data

US 2017/0371859 A1    Dec. 28, 2017

Related U.S. Application Data

(63) Continuation of application No. 14/843,261, filed on Sep. 2, 2015, now Pat. No. 9,852,124.

(51) Int. Cl.
*G06F 17/27* (2006.01)
*G06F 17/28* (2006.01)

(52) U.S. Cl.
CPC ...... *G06F 17/2755* (2013.01); *G06F 17/2785* (2013.01)

(58) Field of Classification Search
None
See application file for complete search history.

(56) References Cited

U.S. PATENT DOCUMENTS

| | | | |
|---|---|---|---|
| 5,724,594 A | 3/1998 | Pentheroudakis | |
| 5,870,702 A | 2/1999 | Yamabana | |
| 6,173,253 B1 | 1/2001 | Abe et al. | |
| 6,961,464 B2 | 11/2005 | Magoshi et al. | |
| 7,398,210 B2 | 7/2008 | Valdes et al. | |
| 7,672,922 B2 | 3/2010 | Kaplan | |
| 7,680,649 B2 | 3/2010 | Park | |
| 7,860,873 B2 | 12/2010 | Campbell | |
| 7,945,527 B2 | 5/2011 | Michelin | |
| 8,229,878 B2 | 7/2012 | Michelin | |
| 8,271,411 B2 | 9/2012 | Kaplan | |
| 9,852,124 B2 * | 12/2017 | Allen | G06F 17/2755 |
| 9,852,125 B2 * | 12/2017 | Allen | G06F 17/2755 |

(Continued)

OTHER PUBLICATIONS

"List of IBM Patents or Patent Applications Treated as Related," Letter from Leslie A. Van Leeuwen, Aug. 27, 2017, 1 page.

*Primary Examiner* — Satwant Singh
(74) *Attorney, Agent, or Firm* — VanLeeuwen & VanLeeuwen; Diana R. Gerhardt

(57) ABSTRACT

An approach is provided to discover new portmanteau, such as when ingesting documents into a question answering (QA) system. The approach works by analyzing a words included in electronic documents and identifies words as being possible portmanteaus. To analyze a portmanteau found in a document, the approach identifies morphemes that are included in the identified portmanteau and candidate words that correspond to each of the identified morphemes. A meaning for the new portmanteau is then derived from the meanings of the candidate word meanings.

20 Claims, 8 Drawing Sheets

(56) References Cited

U.S. PATENT DOCUMENTS

| | | |
|---|---|---|
| 2008/0059421 A1 | 3/2008 | Baartman et al. |
| 2009/0171937 A1 | 7/2009 | Chen et al. |
| 2011/0161073 A1 | 6/2011 | Lesher et al. |
| 2011/0178794 A1 | 7/2011 | Michelin |
| 2014/0136567 A1 | 5/2014 | Bhalotia |
| 2014/0278357 A1* | 9/2014 | Horton .................. G06F 17/277 704/9 |
| 2017/0046311 A1 | 2/2017 | Walker et al. |
| 2017/0060845 A1 | 3/2017 | Allen et al. |
| 2017/0060849 A1 | 3/2017 | Allen et al. |
| 2017/0103062 A1 | 4/2017 | Zhang et al. |
| 2017/0103338 A1 | 4/2017 | Zhang et al. |

* cited by examiner

US 10,108,602 B2

DYNAMIC PORTMANTEAU WORD SEMANTIC IDENTIFICATION

BACKGROUND

In modern language usage, new words are frequently created based on the fusion of two or more word or parts of words (morphenes). For example, words such as "bromance," ("brotherly"+"romance"), "frenemy," ("friend"+"enemy"), "infotainment," ("information"+"entertainment"), "edutainment," ("education"+"entertainment"), and so on. Assisted by their use in social and traditional media, these new words (portmanteau) gain fast traction and acceptance by the public before they are formally added to dictionaries. Consequently, new portmanteaus are frequently found in areas of pop culture. Other areas, such as science, also have portmanteaus, however in other areas portmanteaus often develop somewhat more slowly than in fast changing areas like pop culture. In science, portmanteaus such as "antimatter," "positron," etc. have been created over time by combining multiple word parts. Consequently, such portmanteaus in slower-developing areas often have established meanings which are more readily available to question answering (QA) systems. However, newly formed portmanteaus often have no established meaning and are therefore difficult to process by a QA system. When a QA system encounters these new portmanteaus, it is very likely that these words do not exist in the QA system's corpus/dictionary. As such, the QA system may not be able to accurately understand the question or return an accurate answer. Consequently, the performance of the QA system will not improve until natural language process (NLP) detection system is updated to add these new portmanteaus to the dictionary.

BRIEF SUMMARY

An approach is provided to discover new portmanteau, such as when ingesting documents into a question answering (QA) system. The approach works by analyzing a words included in electronic documents and identifies words as being possible portmanteaus. To analyze a portmanteau found in a document, the approach identifies morphemes that are included in the identified portmanteau and candidate words that correspond to each of the identified morphemes. A meaning for the new portmanteau is then derived from the meanings of the candidate word meanings. In one embodiment, the derived portmanteau meaning is stored in a question answering (QA) system. The approach further identifies a number of phonemes from the portmanteau. The phonemes are then used to filter the candidate words that correspond to each of the identified morphemes.

In one embodiment, the approach selects a leading morpheme and a trailing morpheme from the portmanteau. A combined usage of the leading and trailing morpheme is then analyzed with the derived portmanteau meaning being based on the combined usage. In a further embodiment, the approach calculates a first string metric between the leading morpheme and the candidate word corresponding to the leading morpheme and a second string metric between the trailing morpheme and the candidate word corresponding to the trailing morpheme. The first and second string metric are combined and the combined usage is based on the combination of the first and second string metric. In one embodiment, the string metrics are Levenshtein distance scores.

In another combined usage embodiment, the approach selects a leading candidate word corresponding to the leading morpheme and a trailing candidate word corresponding to the trailing morpheme with a possible portmanteau meaning being generated by combining the meanings of leading and trailing candidate words. Combinations of leading and trailing candidate words can be processed, each resulting in a score with the approach using the combination with the highest score as the meaning of the portmanteau.

The foregoing is a summary and thus contains, by necessity, simplifications, generalizations, and omissions of detail; consequently, those skilled in the art will appreciate that the summary is illustrative only and is not intended to be in any way limiting. Other aspects, inventive features, and advantages of the present disclosure, as defined solely by the claims, will become apparent in the non-limiting detailed description set forth below.

BRIEF DESCRIPTION OF THE SEVERAL VIEWS OF THE DRAWINGS

The present disclosure may be better understood, and its numerous objects, features, and advantages made apparent to those skilled in the art by referencing the accompanying drawings, wherein.

DETAILED DESCRIPTION

Figure 1:
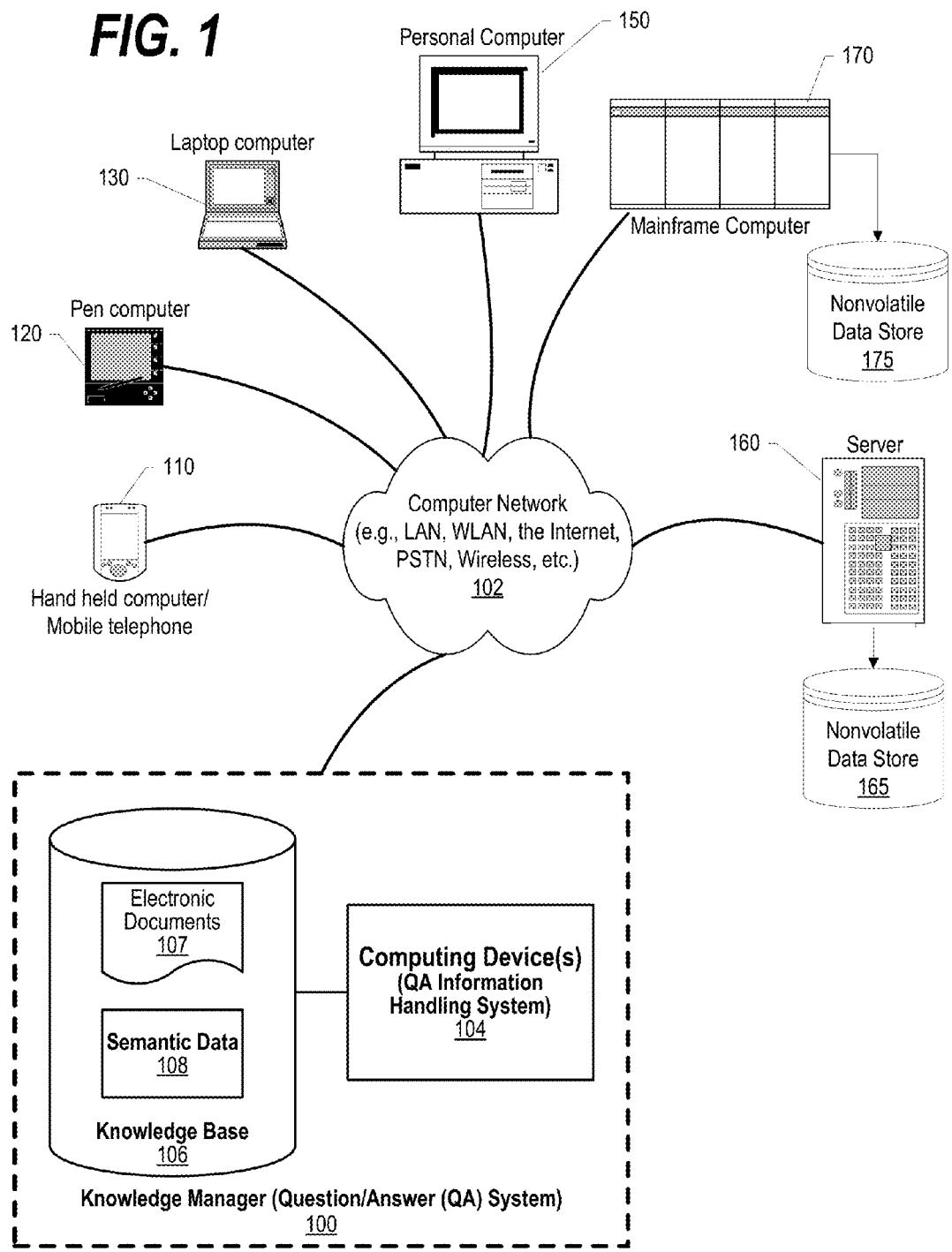
FIG. 1 depicts a schematic diagram of one illustrative embodiment of a question answering (QA) system in a computer network.

FIGS. 1-8 depict an approach that identifies portmanteaus by extracting potential morphemes and phonemes from the portmanteau term and surrounding context. The approach extrapolates each morpheme and phoneme and their meaning and most likely meaning in the context of the sentence or paragraph, then a technique is used to score the highest likely set of combination definitions for set of morphemes and phonemes. The top scored definitions are then use as a combination definition for the portmanteau term in the question answering (QA) system corpus.

A key novelty of the approach lies in dynamically extrapolating the set of morphemes and the potential words they come from within the context and then deducing where a combination is likely within the particular context of the term being used through a set of definition clusters and themes within the paragraph. The approach then updates a dictionary and metadata for the portmanteau term within the document or the QA system corpora. By having a system that can dynamically identify portmanteaus, extract their most likely meanings, and insert the result to dictionary, the QA system can improve it's accuracy.

Combining morphemes and phonemes found in a portmanteau to come to a more possible meaning based on both relational or similar terms both syntactically and phonetically and scoring them with context to determine the best meaning for a portmanteau. The approach can be utilized in a variety of settings such as to provide meaning in an e-reader or dictionary, for term expansion for better hits on candidate answer searches, and for dictionary and lexicon creation.

More specifically, the approach selects a set of unknown words then dissects them into candidate portmanteau terms (e.g., "bro" and "mance", etc.). For each candidate portmanteau term, the approach generates and computes a word list of morphemes and phonemes for each term found in the portmanteau. The approach then combines the words from the generated list with their definitions for matches in combinations that match the context, theme, and/or meaning of the phrase, document or passage in which the portmanteau was used. The analyzed usage includes similar words within a close edit distance found in related passages or documents. The definitions that match the best for all candidate terms to the passage are then selected as the meaning of the new portmanteau.

The terminology used herein is for the purpose of describing particular embodiments only and is not intended to be limiting of the disclosure. As used herein, the singular forms "a", "an" and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one or more other features, integers, steps, operations, elements, components, and/or groups thereof.

The corresponding structures, materials, acts, and equivalents of all means or step plus function elements in the claims below are intended to include any structure, material, or act for performing the function in combination with other claimed elements as specifically claimed. The description of the present disclosure has been presented for purposes of illustration and description, but is not intended to be exhaustive or limited to the disclosure in the form disclosed. Many modifications and variations will be apparent to those of ordinary skill in the art without departing from the scope and spirit of the disclosure. The embodiment was chosen and described in order to best explain the principles of the disclosure and the practical application, and to enable others of ordinary skill in the art to understand the disclosure for various embodiments with various modifications as are suited to the particular use contemplated.

The present invention may be a system, a method, and/or a computer program product. The computer program product may include a computer readable storage medium (or media) having computer readable program instructions thereon for causing a processor to carry out aspects of the present invention.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punchcards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, or either source code or object code written in any combination of one or more programming languages, including an object oriented programming language such as Smalltalk, C++ or the like, and conventional procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions. The following detailed description will generally follow the summary of the disclosure, as set forth above, further explaining and expanding the definitions of the various aspects and embodiments of the disclosure as necessary.

FIG. 1 depicts a schematic diagram of one illustrative embodiment of a question/answer (QA) system 100 in a computer network 102. QA system 100 may include knowledge manager 104, which comprises one or more processors and one or more memories, and potentially any other computing device elements generally known in the art including buses, storage devices, communication interfaces, and the like. Computer network 102 may include other computing devices in communication with each other and with other devices or components via one or more wired and/or wireless data communication links, where each communication link may comprise one or more of wires, routers, switches, transmitters, receivers, or the like. QA system 100 and network 102 may enable question/answer (QA) generation functionality for one or more content users. Other embodiments may include QA system 100 interacting with components, systems, sub-systems, and/or devices other than those depicted herein.

QA system 100 may receive inputs from various sources. For example, QA system 100 may receive input from the network 102, a corpus of electronic documents 107 or other data, semantic data 108, and other possible sources of input. In one embodiment, some or all of the inputs to QA system 100 route through the network 102 and stored in knowledge base 106. The various computing devices on the network 102 may include access points for content creators and content users. Some of the computing devices may include devices for a database storing the corpus of data. The network 102 may include local network connections and remote connections in various embodiments, such that QA system 100 may operate in environments of any size, including local and global, e.g., the Internet. Additionally, QA system 100 serves as a front-end system that can make available a variety of knowledge extracted from or represented in documents, network-accessible sources and/or structured data sources. In this manner, some processes populate the knowledge manager with the knowledge manager also including input interfaces to receive knowledge requests and respond accordingly.

In one embodiment, a content creator creates content in a document 107 for use as part of a corpus of data with QA system 100. The document 107 may include any file, text, article, or source of data for use in QA system 100. Content users may access QA system 100 via a network connection or an Internet connection to the network 102, and may input questions to QA system 100, which QA system 100 answers according to the content in the corpus of data. As further described below, when a process evaluates a given section of a document for semantic content, the process can use a variety of conventions to query it from knowledge manager 104. One convention is to send a well-formed question.

Semantic data 108 is content based on the relation between signifiers, such as words, phrases, signs, and symbols, and what they stand for, their denotation, or connotation. In other words, semantic data 108 is content that interprets an expression, such as by using Natural Language Processing (NLP). In one embodiment, the process sends well-formed questions (e.g., natural language questions, etc.) to QA system 100 and QA system 100 may interpret the question and provide a response that includes one or more answers to the question. In some embodiments, QA system 100 may provide a response to users in a ranked list of answers.

In some illustrative embodiments, QA system 100 may be the IBM Watson™ QA system available from International Business Machines Corporation of Armonk, N.Y., which is augmented with the mechanisms of the illustrative embodiments described hereafter. The IBM Watson™ knowledge manager system may receive an input question which it then parses to extract the major features of the question, that in turn are then used to formulate queries that are applied to the corpus of data. Based on the application of the queries to the corpus of data, a set of hypotheses, or candidate answers to the input question, are generated by looking across the corpus of data for portions of the corpus of data that have some potential for containing a valuable response to the input question.

The IBM Watson™ QA system then performs deep analysis on the language of the input question and the language used in each of the portions of the corpus of data found during the application of the queries using a variety of reasoning algorithms. There may be hundreds or even thousands of reasoning algorithms applied, each of which performs different analysis, e.g., comparisons, and generates a score. For example, some reasoning algorithms may look at the matching of terms and synonyms within the language of the input question and the found portions of the corpus of data. Other reasoning algorithms may look at temporal or spatial features in the language, while others may evaluate the source of the portion of the corpus of data and evaluate its veracity.

The scores obtained from the various reasoning algorithms indicate the extent to which the potential response is inferred by the input question based on the specific area of focus of that reasoning algorithm. Each resulting score is then weighted against a statistical model. The statistical model captures how well the reasoning algorithm performed at establishing the inference between two similar passages for a particular domain during the training period of the IBM Watson™ QA system. The statistical model may then be used to summarize a level of confidence that the IBM Watson™ QA system has regarding the evidence that the potential response, i.e. candidate answer, is inferred by the question. This process may be repeated for each of the candidate answers until the IBM Watson™ QA system identifies candidate answers that surface as being significantly stronger than others and thus, generates a final answer, or ranked set of answers, for the input question. More information about the IBM Watson™ QA system may be obtained, for example, from the IBM Corporation website, IBM Redbooks, and the like. For example, information about the IBM Watson™ QA system can be found in Yuan et al., "Watson and Healthcare," IBM developerWorks, 2011 and "The Era of Cognitive Systems: An Inside Look at IBM Watson and How it Works" by Rob High, IBM Redbooks, 2012.

Types of information handling systems that can utilize QA system 100 range from small handheld devices, such as handheld computer/mobile telephone 110 to large mainframe systems, such as mainframe computer 170. Examples of handheld computer 110 include personal digital assistants (PDAs), personal entertainment devices, such as MP3 players, portable televisions, and compact disc players. Other examples of information handling systems include pen, or tablet, computer 120, laptop, or notebook, computer 130, personal computer system 150, and server 160. As shown, the various information handling systems can be networked together using computer network 102. Types of computer network 102 that can be used to interconnect the various information handling systems include Local Area Networks (LANs), Wireless Local Area Networks (WLANs), the Internet, the Public Switched Telephone Network (PSTN), other wireless networks, and any other network topology that can be used to interconnect the information handling systems. Many of the information handling systems include nonvolatile data stores, such as hard drives and/or nonvolatile memory. Some of the information handling systems shown in FIG. 1 depicts separate nonvolatile data stores (server 160 utilizes nonvolatile data store 165, and mainframe computer 170 utilizes nonvolatile data store 175. The nonvolatile data store can be a component that is external to the various information handling systems or can be internal to one of the information handling systems. An illustrative example of an information handling system showing an exemplary processor and various components commonly accessed by the processor is shown in FIG. 2.

Figure 2:
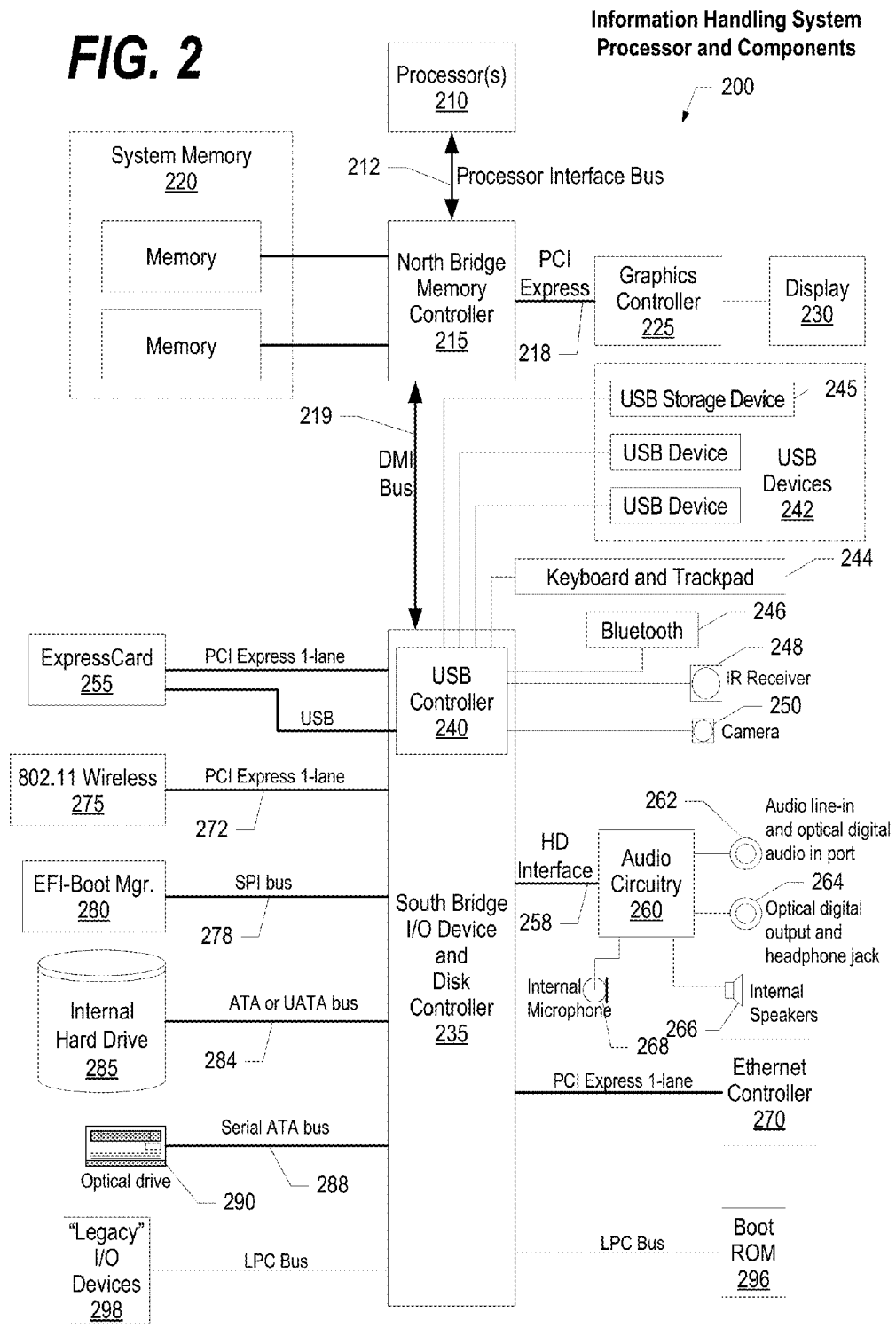
FIG. 2 illustrates an information handling system, more particularly, a processor and common components, which is a simplified example of a computer system capable of performing the computing operations described herein.

FIG. 2 illustrates information handling system 200, more particularly, a processor and common components, which is a simplified example of a computer system capable of performing the computing operations described herein. Information handling system 200 includes one or more processors 210 coupled to processor interface bus 212. Processor interface bus 212 connects processors 210 to Northbridge 215, which is also known as the Memory Controller Hub (MCH). Northbridge 215 connects to system memory 220 and provides a means for processor(s) 210 to access the system memory. Graphics controller 225 also connects to Northbridge 215. In one embodiment, PCI Express bus 218 connects Northbridge 215 to graphics controller 225. Graphics controller 225 connects to display device 230, such as a computer monitor.

Northbridge 215 and Southbridge 235 connect to each other using bus 219. In one embodiment, the bus is a Direct Media Interface (DMI) bus that transfers data at high speeds in each direction between Northbridge 215 and Southbridge 235. In another embodiment, a Peripheral Component Interconnect (PCI) bus connects the Northbridge and the Southbridge. Southbridge 235, also known as the I/O Controller Hub (ICH) is a chip that generally implements capabilities that operate at slower speeds than the capabilities provided by the Northbridge. Southbridge 235 typically provides various busses used to connect various components. These busses include, for example, PCI and PCI Express busses, an ISA bus, a System Management Bus (SMBus or SMB), and/or a Low Pin Count (LPC) bus. The LPC bus often connects low-bandwidth devices, such as boot ROM 296 and "legacy" I/O devices (using a "super I/O" chip). The "legacy" I/O devices (298) can include, for example, serial and parallel ports, keyboard, mouse, and/or a floppy disk controller. The LPC bus also connects Southbridge 235 to Trusted Platform Module (TPM) 295. Other components often included in Southbridge 235 include a Direct Memory Access (DMA) controller, a Programmable Interrupt Controller (PIC), and a storage device controller, which connects Southbridge 235 to nonvolatile storage device 285, such as a hard disk drive, using bus 284.

ExpressCard 255 is a slot that connects hot-pluggable devices to the information handling system. ExpressCard 255 supports both PCI Express and USB connectivity as it connects to Southbridge 235 using both the Universal Serial Bus (USB) the PCI Express bus. Southbridge 235 includes USB Controller 240 that provides USB connectivity to devices that connect to the USB. These devices include webcam (camera) 250, infrared (IR) receiver 248, keyboard and trackpad 244, and Bluetooth device 246, which provides for wireless personal area networks (PANs). USB Controller 240 also provides USB connectivity to other miscellaneous USB connected devices 242, such as a mouse, removable nonvolatile storage device 245, modems, network cards, ISDN connectors, fax, printers, USB hubs, and many other types of USB connected devices. While removable nonvolatile storage device 245 is shown as a USB-connected device, removable nonvolatile storage device 245 could be connected using a different interface, such as a Firewire interface, etcetera.

Wireless Local Area Network (LAN) device 275 connects to Southbridge 235 via the PCI or PCI Express bus 272. LAN device 275 typically implements one of the IEEE 802.11 standards of over-the-air modulation techniques that all use the same protocol to wireless communicate between information handling system 200 and another computer system or device. Optical storage device 290 connects to Southbridge 235 using Serial ATA (SATA) bus 288. Serial ATA adapters and devices communicate over a high-speed serial link. The Serial ATA bus also connects Southbridge 235 to other forms of storage devices, such as hard disk drives. Audio circuitry 260, such as a sound card, connects to Southbridge 235 via bus 258. Audio circuitry 260 also provides functionality such as audio line-in and optical digital audio in port 262, optical digital output and headphone jack 264, internal speakers 266, and internal microphone 268. Ethernet controller 270 connects to Southbridge 235 using a bus, such as the PCI or PCI Express bus. Ethernet controller 270 connects information handling system 200 to a computer network, such as a Local Area Network (LAN), the Internet, and other public and private computer networks.

While FIG. 2 shows one information handling system, an information handling system may take many forms, some of which are shown in FIG. 1. For example, an information handling system may take the form of a desktop, server, portable, laptop, notebook, or other form factor computer or data processing system. In addition, an information handling system may take other form factors such as a personal digital assistant (PDA), a gaming device, ATM machine, a portable telephone device, a communication device or other devices that include a processor and memory.

Figure 3:
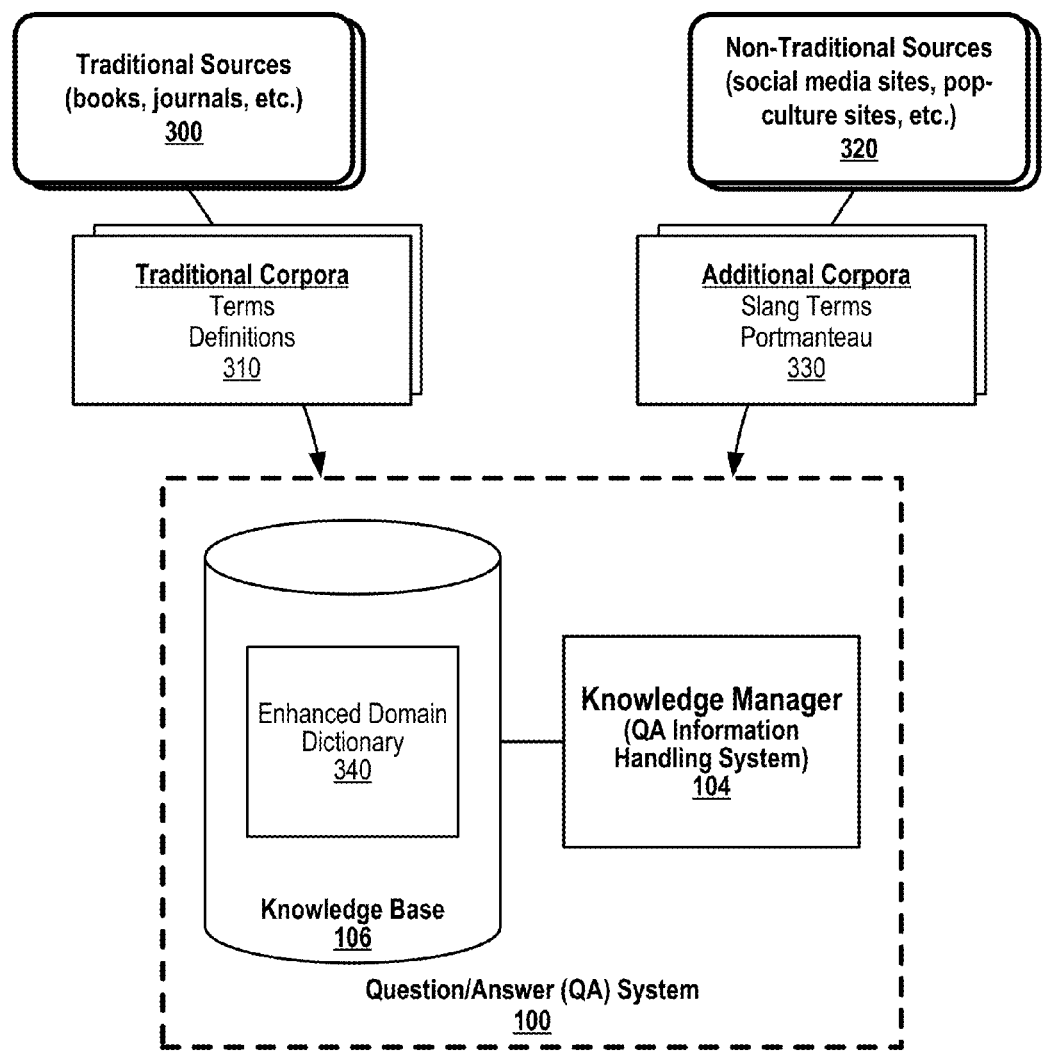
FIG. 3 is an exemplary diagram depicting the traditional and non-traditional content sources being ingested into a question answering (QA) system, some with words that are slang and/or portmanteaus.

FIG. 3 is an exemplary diagram depicting the traditional and non-traditional content sources being ingested into a question answering (QA) system, some with words that are slang and/or portmanteaus. QA system 100 ingests a variety of source documents, including traditional sources 300 (e.g., books, journals, articles, etc.) as well as non-traditional sources 320 (e.g., social media site data, pop-culture site data, blog data, etc.). Traditional sources 300 are more likely to include well established terms with well established definitions 310. On the other hand, non-traditional sources 320 are more likely to include terms with definitions that are not as well known as well as introduce new terms never encountered before by the QA system. These terms can include slang terms and portmanteaus 330. Understanding the meaning of newly encountered portmanteaus allows QA system to better process documents that include such portmanteaus. The newly encountered portmanteaus and their derived meanings can be stored by QA system 100 in enhanced domain dictionary 340.

Figure 4:
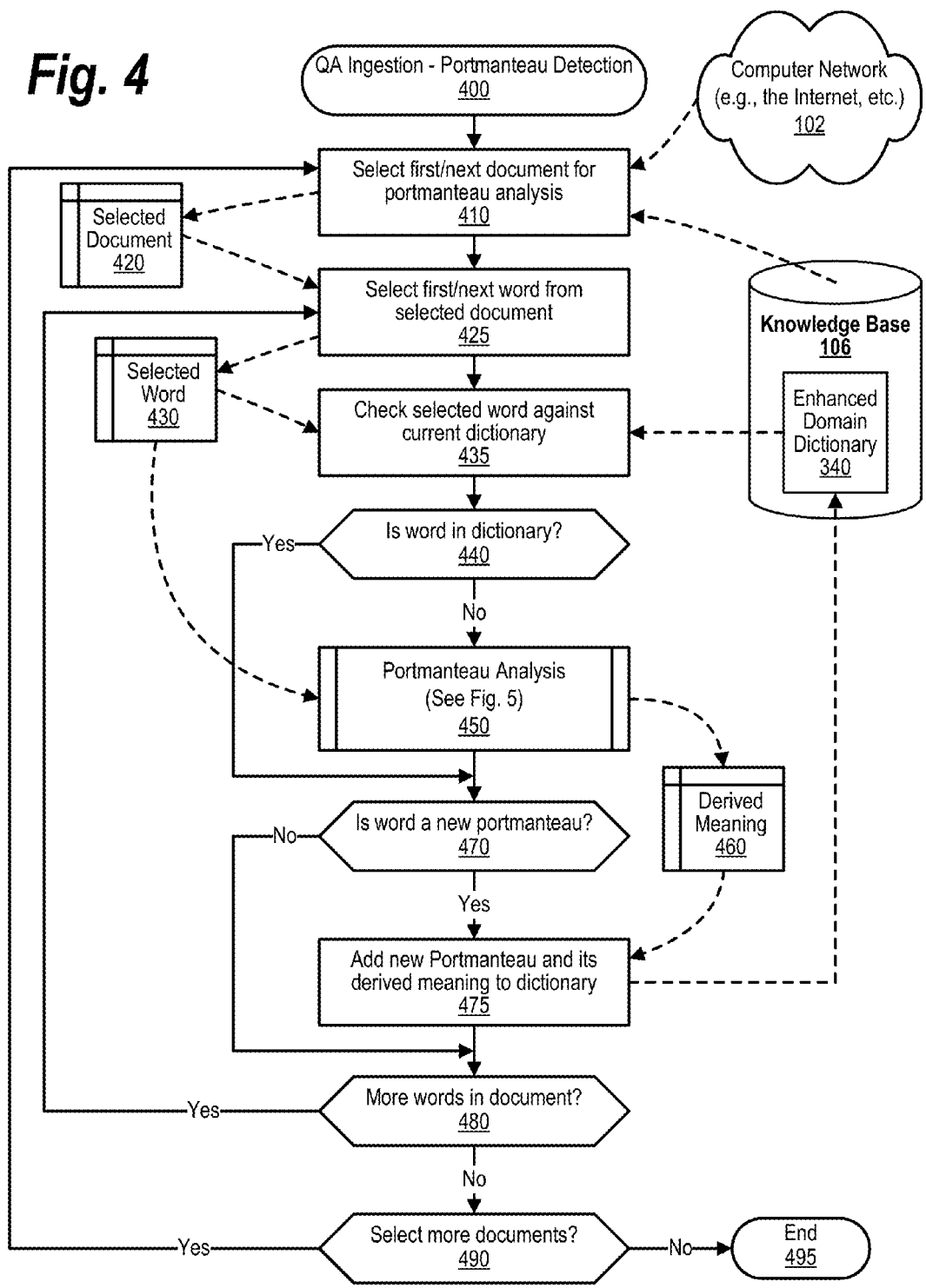
FIG. 4 is an exemplary flowchart that performs steps to detect content that contains portmanteaus before being ingested into a question answering (QA) system.

FIG. 4 is an exemplary flowchart that performs steps to detect content that contains portmanteaus before being ingested into a question answering (QA) system. FIG. 4 processing commences at 400 and shows the steps taken by a process that performs QA Ingestion and, more specifically, that portion of the QA ingestion process that performs Portmanteau Detection.

At step 410, the process selects the first document for portmanteau analysis. in one embodiment, electronic documents are retrieved from various network sources, such as web sites and the like. The selected document is stored in selected document memory area 420. At step 425, the process selects the first word from selected document and the selected word is stored in memory area 430. At step 435, the process checks the selected word against the current dictionary of words known to the QA system.

The process determines as to whether the selected word is already in the dictionary, and therefore already known by the QA system (decision 440). If the selected word is already in the dictionary, then decision 440 branches to the 'yes' branch bypassing predefined process 450. On the other hand, if the selected word is not in the dictionary, then decision 440 branches to the 'no' branch whereupon, at predefined process 450, the process performs the Portmanteau Analysis Routine (see FIG. 5 and corresponding text for processing details).

Predefined process 450 identifies whether the unknown word is a portmanteau and, if the word is a portmanteau, the process generates a derived meaning of the portmanteau which is stored in memory area 460. The process determines as to whether the Portmanteau Analysis Routine identified the word as being a new portmanteau (decision 470). If is word is a new portmanteau, then decision 470 branches to the 'yes' branch whereupon, at step 475, the process retrieves the derived meaning of the portmanteau from memory area 460 and adds the new portmanteau and its derived meaning to the QA system dictionary 340. On the other hand, if the word is not a new portmanteau (e.g., a slang word or other unknown word, etc.), then decision 470 branches to the 'no' branch bypassing step 475.

The process determines as to whether there are more words in the selected document to process (decision 480). If there are more words in the selected document to process, then decision 480 branches to the 'yes' branch which loops back to step 425 to select and process the next word from the document as described above. This looping continues until there are no more words in the document left to process, at which point decision 480 branches to the 'no' branch exiting the loop.

The process next determines as to whether there are more documents to select and process as described above (decision 490). If there are more documents to select and process, then decision 490 branches to the 'yes' branch which loops back to step 410 to select the next document for processing. This looping continues until there are no more documents being processed, at which point decision 490 branches to the 'no' branch exiting the loop. FIG. 4 processing thereafter ends at 495.

Figure 5:
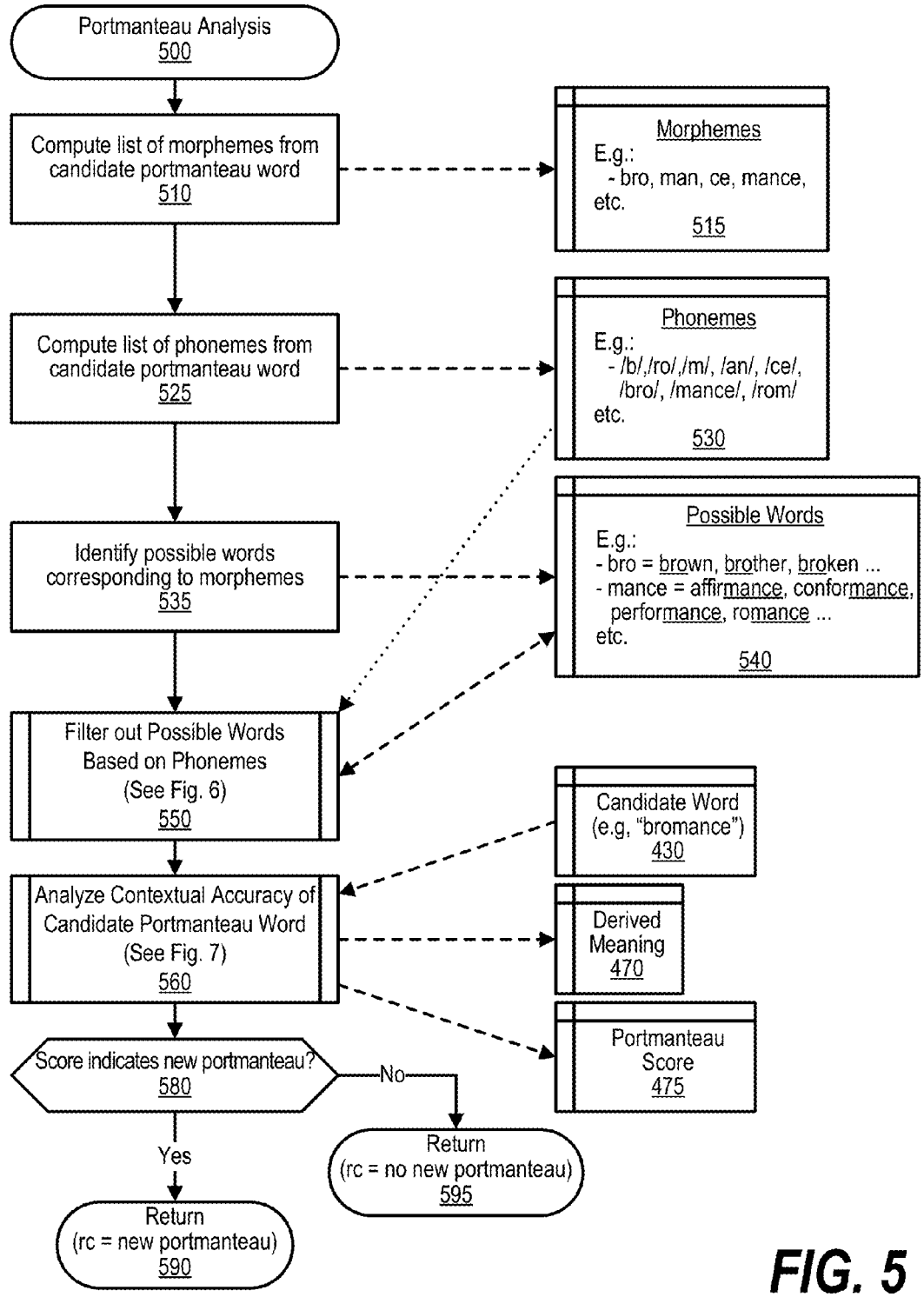
FIG. 5 is an exemplary flowchart that performs steps to perform a portmanteau analysis on a candidate word found in content that is being ingested by the QA system.

FIG. 5 is an exemplary flowchart that performs steps to perform a portmanteau analysis on a candidate word found in content that is being ingested by the QA system. FIG. 5 processing commences at 500 and shows the steps taken by a process that performs the portmanteau analysis. At step 510, the process computes a list of morphemes from the candidate portmanteau word.

Step 510 stores the morphemes (e.g.: —bro, man, ce, mance, etc.) in memory area 515. At step 525, the process computes a list of phonemes from the candidate portmanteau word. The list of phonemes (e.g.: —/b/, /ro/, /m/, /an/, /ce/, /bro/, /mance/, /rom/ etc.) are stored in memory area 530. At step 535, the process identifies possible words that correspond to the morphemes that were found in step 510. Step 535 stores the possible words (e.g.: —bro=brown, brother, broken . . . —mance=affirmance, conformance, performance, romance . . . etc.) in memory area 540.

Figure 6:
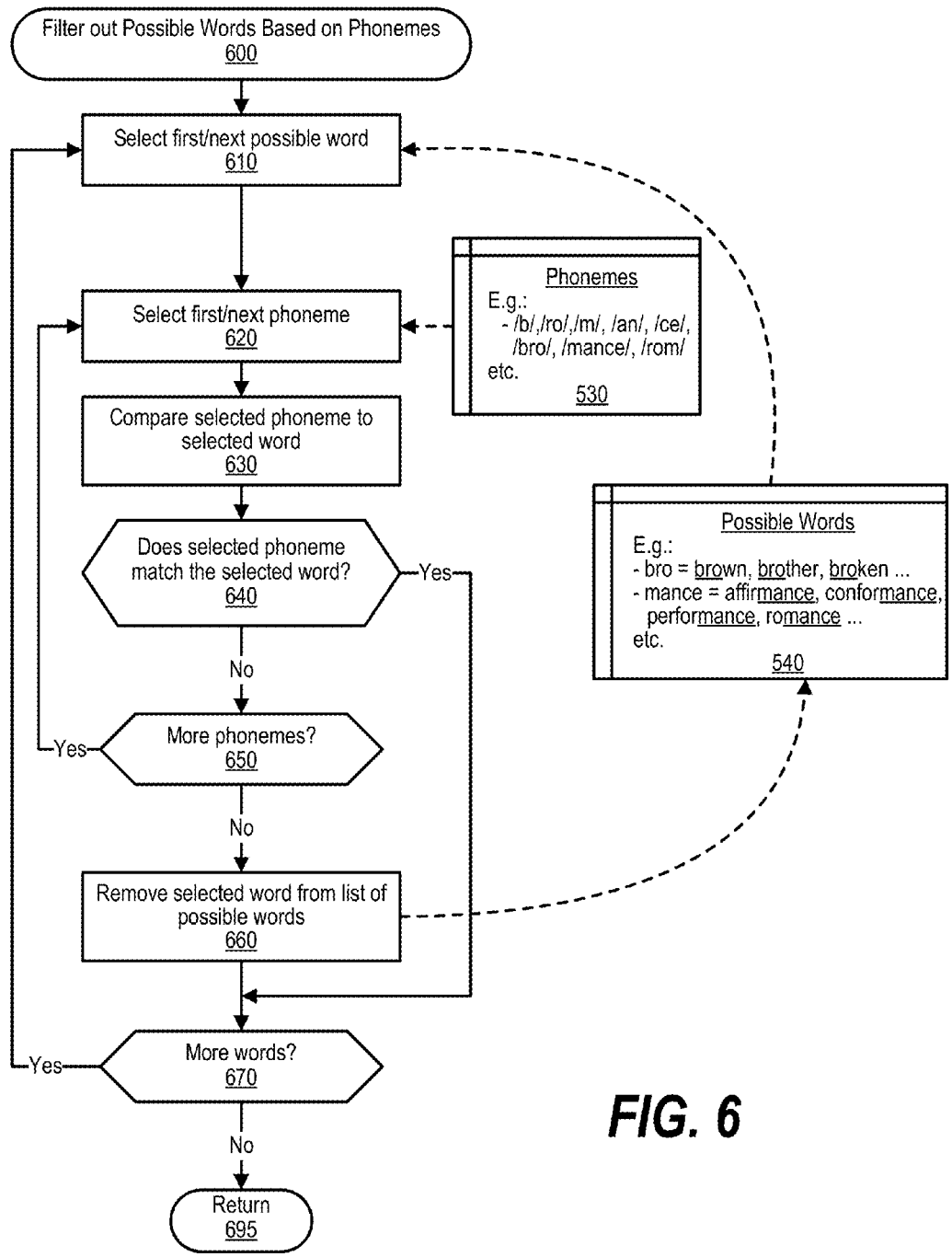
FIG. 6 is an exemplary flowchart showing steps that filter out possible words based on phonemes.

At predefined process 550, the process performs the Filter Out Possible Words Based on Phonemes Routine (see FIG. 6 and corresponding text for processing details). The result of predefined process 550 will likely be a smaller set of possible words that are stored in memory area 540.

Figure 7:
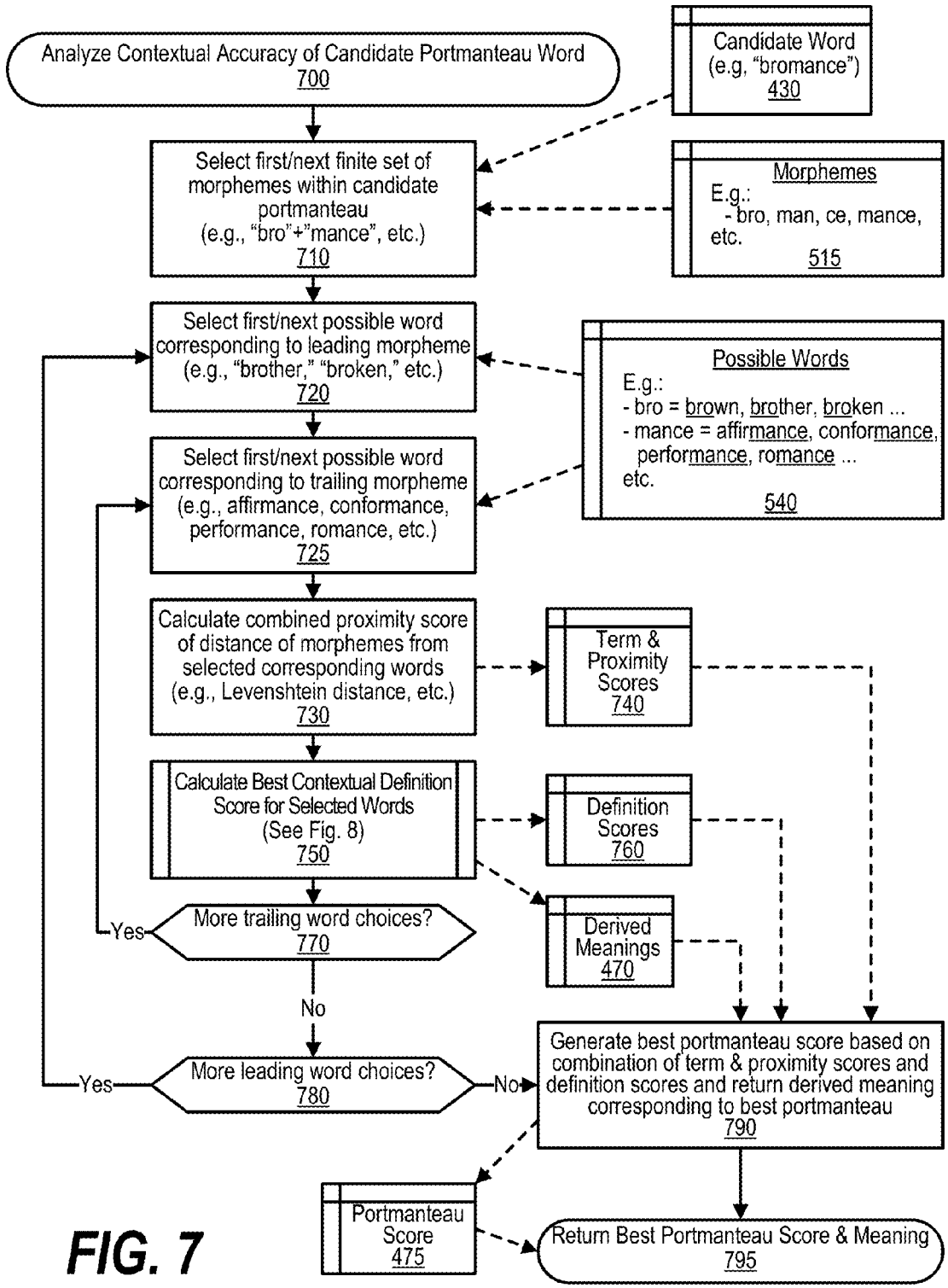
FIG. 7 is an exemplary flowchart showing steps that analyzes the contextual accuracy of a candidate portmanteau word.

At predefined process 560, the process performs the Analyze Contextual Accuracy of Candidate Portmanteau Word Routine (see FIG. 7 and corresponding text for processing details). Predefined process 560 processes the candidate portmanteau word from memory area 430 and outputs a derived meaning of the candidate portmanteau into memory area 470 and a portmanteau score that is output into memory area 475.

The process determines as to whether score stored in memory area 475 indicates that the word is a new portmanteau (decision 580). If the score indicates that the word is a new portmanteau, then decision 580 branches to the 'yes' branch whereupon processing returns to the calling routine (see FIG. 4) at 590 with a return code indicating that the word is a new portmanteau. On the other hand, if the score does not indicate that the word is a new portmanteau, then decision 580 branches to the 'no' branch whereupon processing returns to the calling routine (see FIG. 4) at 595 with a return code indicating that the word is a not a new portmanteau.

FIG. 6 is an exemplary flowchart showing steps that filter out possible words based on phonemes. FIG. 6 processing commences at 600 and shows the steps taken by a process that filters out possible candidate words based on phonemes found in the candidate portmanteau. At step 610, the process selects the first possible candidate word. The possible candidate words are retrieved from memory area 540.

At step 620, the process selects the first phoneme from the list of phonemes that correspond to the candidate portmanteau. For example, for the portmanteau "bromance," the phonemes might include /b/, /ro/, /m/, /an/, /ce/, /bro/, /mance/, /rom/ etc. At step 630, the process compares selected phoneme to selected candidate word that was retrieved from memory area 540. The process determines as to whether the selected phoneme matches the selected word (decision 640).

If the selected phoneme matches the selected candidate word, then decision 640 branches to the 'yes' branch bypassing decision 650 and step 660. On the other hand, if the selected phoneme does not match the selected candidate word, then decision 640 branches to the 'no' branch whereupon another decision is made (decision 650) to see if there are more phonemes in the list that might possibly match the selected candidate word. If there are more phonemes in the list that might possibly match the selected candidate word, then decision 650 branches to the 'yes' branch which loops back to select and compare the next phoneme from the list to the selected candidate word. This looping continues until either a match is made at decision 640 (indicating that the candidate word should remain a candidate), or there are no more phonemes to select and compare to the selected candidate word, at which point decision 650 branches to the 'no' branch to remove the selected candidate word from the list of candidate words at step 660.

After a selected candidate word has been processed and either removed from the list of possible candidate words or kept in the list, the process determines whether there are more candidate words to process (decision 670). If there are more candidate words to process, then decision 670 branches to the 'yes' branch which loops back to step 610 to select and process the next candidate word from memory area 540 as described above. This looping continues until there are no more candidate words to process, at which point decision 670 branches to the 'no' branch exiting the loop. FIG. 6 processing thereafter returns to the calling routine (see FIG. 5) at 695.

FIG. 7 is an exemplary flowchart showing steps that analyzes the contextual accuracy of a candidate portmanteau word. FIG. 7 processing commences at 700 and shows the steps taken by a process that analyzes the contextual accuracy of the candidate portmanteau word. At step 710, the process selects the first finite set of morphemes within candidate portmanteau (e.g., "bro"+"mance", etc.). Step 710 retrieves the candidate word (e.g, "bromance," etc.) from memory area 430 and retrieves the morphemes (e.g.: —bro, man, ce, mance, etc.) from memory area 515.

At step 720, the process selects the first possible candidate word corresponding to the leading morpheme (e.g., for "bromance" the leading words might be "brother," "broken," etc.). The candidate word is retrieved from memory area 540. At step 725, the process selects the first possible word corresponding to the trailing morpheme (e.g., for "bromance" the trailing words might be "affirmance," "conformance," "performance," "romance," etc.). At step 730, the process calculates combined proximity score of distance of the morphemes from the respective selected corresponding words (e.g., Levenshtein distance, etc.). Step 730 stores the term and proximity scores in memory area 740.

Figure 8:
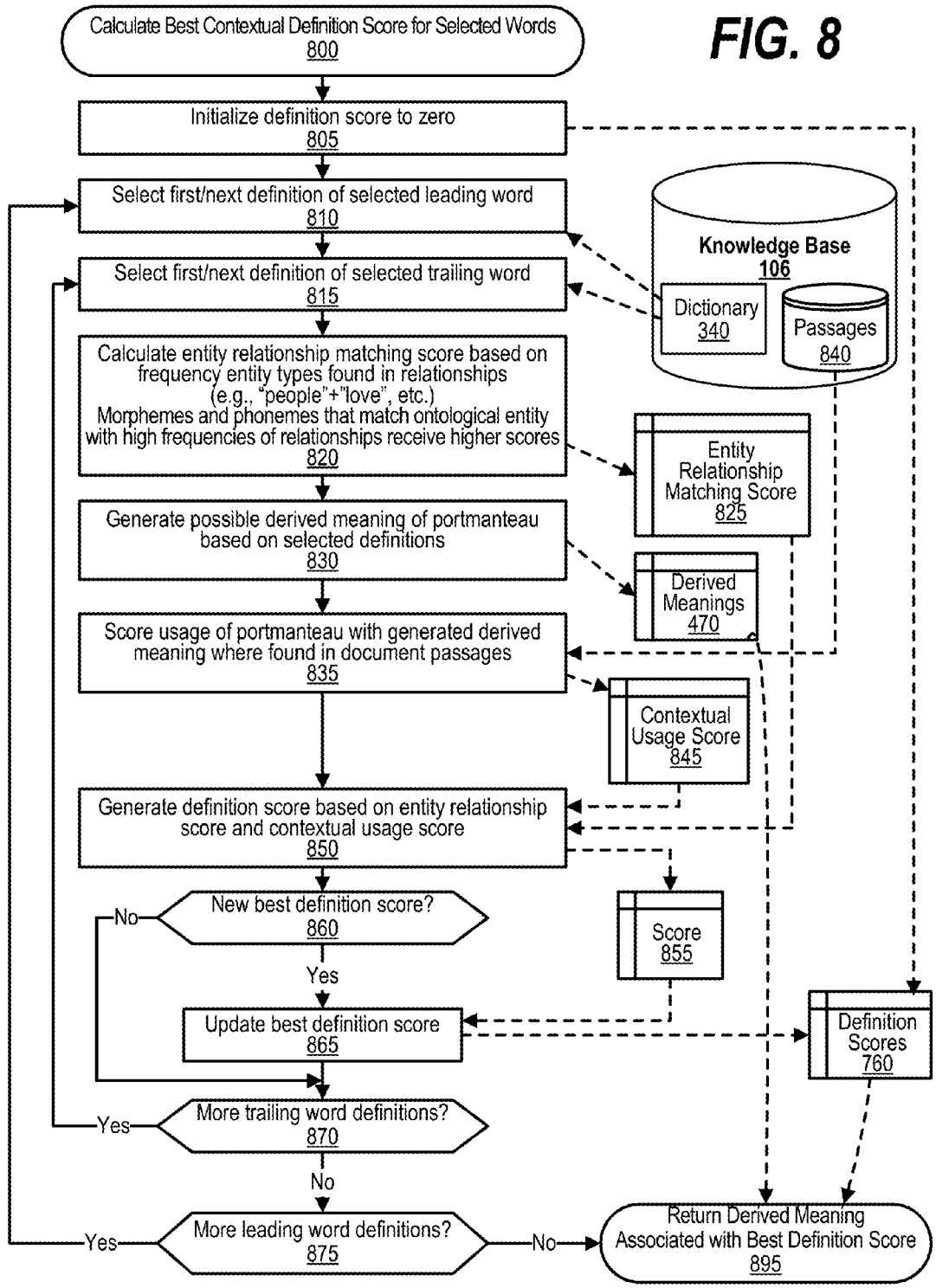
FIG. 8 is an exemplary flowchart showing steps that calculate a best contextual definition score for selected words that might be used to construct a candidate portmanteau.

At predefined process 750, the process performs the Calculate Best Contextual Definition Score for Selected Words Routine (see FIG. 8 and corresponding text for processing details). The result of predefined process 750 are definition scores that are stored in memory area 760 and derived meanings that are stored in memory area 470. The process determines as to whether there are more trailing candidate word choices that correspond to the trailing morpheme (decision 770). If there are more trailing candidate word choices that correspond to the trailing morpheme, then decision 770 branches to the 'yes' branch which loops back to step 725 to process the next trailing candidate word along with the currently selected leading candidate word. This looping continues until there are no more trailing candidate words to process, at which point decision 770 branches to the 'no' branch exiting the loop.

The process next determines as to whether there are more leading candidate word choices that correspond to the leading morpheme (decision 780). If there are more leading candidate word choices that correspond to the leading morpheme, then decision 780 branches to the 'yes' branch which loops back to step 720 to process the next leading candidate word against each of the trailing candidate words as described above. This looping continues until there are no more leading candidate word choices to process, at which point decision 780 branches to the 'no' branch exiting the loop.

At step 790, the process generates the best portmanteau score based on a combination of the term and proximity scores from memory area 740 and definition scores from memory area 760. Step 790 returns the derived meaning corresponding to best portmanteau in memory area 470 and also returns the portmanteau score for the candidate portmanteau word in memory area 475. FIG. 7 processing thereafter returns to the calling routine (see FIG. 5) at 795.

FIG. 8 is an exemplary flowchart showing steps that calculate a best contextual definition score for selected words that might be used to construct a candidate portmanteau. FIG. 8 processing commences at 800 and shows the steps taken by a process that calculates the best contextual definition score for selected candidate words (leading and trailing candidate words).

At step 805, the process initializes the definition score to zero. At step 810, the process selects the first definition of the selected leading word by retrieving the definition from dictionary 340. At step 815, the process selects the first definition of the selected trailing word by retrieving the definition from dictionary 340.

At step 820, the process calculates an entity relationship matching score based on the frequency that the entity types of the words are found in relationships (e.g., "people"+ "love", etc.). Morphemes and phonemes that match ontological entity with high frequencies of relationships receive higher scores. Step 820 stores the relationship matching score in memory area 825.

At step 830, the process generates possible derived meaning of the candidate portmanteau word based on the selected definitions retrieved in steps 810 and 815. Step 830 stores the derived meanings in memory area 470.

At step 835, the process scores the usage of the portmanteau using the generated derived meaning where the portmanteau is found in document passages. If the derived meaning that is being evaluated is a better "fit" given the context of the document passages, then the derived meaning is given a higher score than derived meanings that do not fit well in the contexts of passages where the portmanteau was found. Step 835 retrieves the passages from data store 840 and stores the contextual usage scores in memory area 845.

At step 850, the process generates a definition score for the selected leading and trailing candidate words based on the entity relationship score from memory area 825 and the contextual usage score from memory area 845. Step 850 stores the definition score in memory area 855.

The process determines as to whether the definition score stored in memory area 855 is new best definition score (decision 860). If the definition score stored in memory area 855 represents a new best definition score, then decision 860 branches to the 'yes' branch whereupon, at step 865, the process updates best definition score in memory area 760 with the definition score that was stored in memory area 855. On the other hand, if the definition score stored in memory area 855 is not a new best definition score, then decision 860 branches to the 'no' branch bypassing step 865.

The process determines as to whether there are more trailing word definitions for the selected trailing word (decision 870). If there are more trailing word definitions for the selected trailing word, then decision 870 branches to the 'yes' branch which loops back to step 815 to select and process the next definition for the trailing word. This looping continues until there are no more trailing word definitions for the selected trailing word, at which point decision 870 branches to the 'no' branch exiting the loop.

The process next determines as to whether there are more leading word definitions for the selected leading word (decision 875). If there are more leading word definitions for the selected leading word, then decision 875 branches to the 'yes' branch which loops back to step 815 to select and process the next definition for the leading word. This looping continues until there are no more leading word definitions for the selected leading word, at which point decision 875 branches to the 'no' branch exiting the loop. FIG. 8 processing thereafter returns to the calling routine (see FIG. 7) at 895 with the routine returning the derived meanings of the portmanteau word using the selected leading and trailing candidate words in memory area 470 and the definition scores in memory area 760.

While particular embodiments of the present disclosure have been shown and described, it will be obvious to those skilled in the art that, based upon the teachings herein, that changes and modifications may be made without departing from this disclosure and its broader aspects. Therefore, the appended claims are to encompass within their scope all such changes and modifications as are within the true spirit and scope of this disclosure. Furthermore, it is to be understood that the disclosure is solely defined by the appended claims. It will be understood by those with skill in the art that if a specific number of an introduced claim element is intended, such intent will be explicitly recited in the claim, and in the absence of such recitation no such limitation is present. For non-limiting example, as an aid to understanding, the following appended claims contain usage of the introductory phrases "at least one" and "one or more" to introduce claim elements. However, the use of such phrases should not be construed to imply that the introduction of a claim element by the indefinite articles "a" or "an" limits any particular claim containing such introduced claim element to disclosures containing only one such element, even when the same claim includes the introductory phrases "one or more" or "at least one" and indefinite articles such as "a" or "an"; the same holds true for the use in the claims of definite articles.

The invention claimed is:

1. A method implemented by an information handling system that includes a memory and a processor, the method comprising:
   analyzing a plurality of words included in a plurality of electronic documents, wherein the analysis identifies at least one of the plurality of words as being a portmanteau that is not currently stored in a dictionary utilized by a question answering (QA) system;
   identifying a plurality of morphemes included in the identified portmanteau and one or more candidate words that correspond to each of the identified morphemes, wherein each of the candidate words has a candidate word definition;
   deriving a definition for the identified portmanteau, wherein the deriving comprises creating the definition by combining at least two of the candidate word definitions; and
   storing the identified portmanteau and the derived portmanteau definition in the dictionary utilized by the QA system, wherein the QA system utilizes the derived portmanteau definition to understand and answer one or more questions corresponding to the identified portmanteau.

2. The method of claim 1 wherein the method further comprises:
   identifying a plurality of phonemes included in the identified portmanteau; and
   filtering the candidate words that correspond to each of the identified morphemes based on the identified phonemes.

3. The method of claim 1 further comprising:
   from the plurality of morphemes, selecting a leading morpheme that corresponds to a first portion of the identified portmanteau and a trailing morpheme that corresponds to a second portion of the identified portmanteau; and
   analyzing a combined usage of the leading and trailing morphemes, wherein the derived portmanteau definition is based on the combined usage.

4. The method of claim 3 further comprising:
   calculating a first string metric between the leading morpheme and the candidate word corresponding to the leading morpheme;
   calculating a second string metric between the trailing morpheme and the candidate word corresponding to the trailing morpheme; and
   combining the first and second string metric, wherein the combined usage is based on the combination of the first and second string metric.

5. The method of claim 4 wherein the first and second string metric are each Levenshtein distance scores.

6. The method of claim 4 further comprising:
   selecting a leading candidate word from the plurality of candidate words, wherein the leading candidate word corresponds to the leading morpheme;
   selecting a trailing candidate word from the plurality of candidate words, wherein the trailing candidate word corresponds to the trailing morpheme; and
   generating a possible definition of the identified portmanteau by combining a first definition that corresponds to the leading candidate word with a second definition that corresponds to the trailing candidate word, wherein the combined usage is based on the generated possible definition.

7. The method of claim 6 further comprising:
performing the selecting and generating steps for a plurality of leading and trailing candidate words, wherein the method further comprises:
scoring a plurality of generated possible definitions of the identified portmanteau based on a plurality of combinations of leading and trailing candidate words; and
further scoring the plurality of generated possible definitions based on a contextual usage score based on comparing the possible definitions with a contextual usage of the identified portmanteau in the electronic documents, wherein the combined usage is based on a best scored combination of a selected one of the leading candidate words paired with a selected one of the trailing candidate words.

8. The method of claim 1 further comprising:
from the plurality of morphemes, selecting a plurality of leading morphemes that corresponds to a first portion of the identified portmanteau and a plurality of trailing morphemes that corresponds to a second portion of the identified portmanteau;
analyzing a combined usage of a plurality of combinations of selected leading and trailing morphemes, wherein the derived portmanteau definition is based on the combined usage, and wherein the analyzing further comprises:
calculating a first string metric between each of the selected leading morphemes and one or more candidate words corresponding to each of the selected leading morphemes;
calculating a second string metric between each of the selected trailing morphemes and one or more candidate words corresponding to each of the selected trailing morphemes;
selecting each of the leading candidate words and each of the trailing candidate words, wherein the leading candidate words correspond to the leading morpheme and the trailing candidate words correspond to the trailing morpheme;
scoring a plurality of possible definitions of the identified portmanteau by combining a first definition retrieved for each of the selected leading candidate words with a second definition retrieved for each of the selected trailing candidate words; and
further scoring the plurality of possible definitions based on a contextual usage score based on comparing the possible definitions with a contextual usage of the identified portmanteau in the electronic documents, wherein the combined usage is based on a combination of the first and second string metrics corresponding to each of the leading and trailing morphemes and the scored possible definition of the leading candidate words and the trailing candidate words corresponding to the respective leading and trailing morphemes.

9. An information handling system comprising:
one or more processors;
one or more data stores accessible by at least one of the processors;
a display accessible by at least one of the processors;
a memory coupled to at least one of the processors; and
a set of computer program instructions stored in the memory and executed by at least one of the processors in order to perform actions of:
analyzing a plurality of words included in a plurality of electronic documents, wherein the analysis identifies at least one of the plurality of words as being a portmanteau that is not currently stored in a dictionary utilized by a question answering (QA) system;
identifying a plurality of morphemes included in the identified portmanteau and one or more candidate words that correspond to each of the identified morphemes, wherein each of the candidate words has a candidate word definition;
deriving a definition for the identified portmanteau, wherein the deriving comprises creating the definition by combining at least two of the candidate word definitions; and
storing the identified portmanteau and the derived portmanteau definition in the dictionary utilized by the QA system, wherein the QA system utilizes the derived portmanteau definition to understand and answer one or more questions corresponding to the identified portmanteau.

10. The information handling system of claim 9 wherein the actions further comprise:
identifying a plurality of phonemes included in the identified portmanteau; and
filtering the candidate words that correspond to each of the identified morphemes based on the identified phonemes.

11. The information handling system of claim 9 wherein the actions further comprise:
from the plurality of morphemes, selecting a leading morpheme that corresponds to a first portion of the identified portmanteau and a trailing morpheme that corresponds to a second portion of the identified portmanteau; and
analyzing a combined usage of the leading and trailing morphemes, wherein the derived portmanteau definition is based on the combined usage.

12. The information handling system of claim 11 wherein the actions further comprise:
calculating a first string metric between the leading morpheme and the candidate word corresponding to the leading morpheme;
calculating a second string metric between the trailing morpheme and the candidate word corresponding to the trailing morpheme; and
combining the first and second string metric, wherein the combined usage is based on the combination of the first and second string metric.

13. The information handling system of claim 12 wherein the first and second string metric are each Levenshtein distance scores.

14. The information handling system of claim 12 wherein the actions further comprise:
selecting a leading candidate word from the plurality of candidate words, wherein the leading candidate word corresponds to the leading morpheme;
selecting a trailing candidate word from the plurality of candidate words, wherein the trailing candidate word corresponds to the trailing morpheme; and
generating a possible definition of the identified portmanteau by combining a first definition that corresponds to the leading candidate word with a second definition that corresponds to the trailing candidate word, wherein the combined usage is based on the generated possible definition.

15. The information handling system of claim 14 wherein the actions further comprise:
performing the selecting and generating steps for a plurality of leading and trailing candidate words, wherein the information handling system further comprises:
scoring a plurality of generated possible definitions of the identified portmanteau based on a plurality of combinations of leading and trailing candidate words; and
further scoring the plurality of generated possible definitions based on a contextual usage score based on comparing the possible definitions with a contextual usage of the identified portmanteau in the electronic documents, wherein the combined usage is based on a best scored combination of a selected one of the leading candidate words paired with a selected one of the trailing candidate words.

16. The information handling system of claim 9 wherein the actions further comprise:
from the plurality of morphemes, selecting a plurality of leading morphemes that corresponds to a first portion of the identified portmanteau and a plurality of trailing morphemes that corresponds to a second portion of the identified portmanteau;
analyzing a combined usage of a plurality of combinations of selected leading and trailing morphemes, wherein the derived portmanteau definition is based on the combined usage, and wherein the analyzing further comprises:
calculating a first string metric between each of the selected leading morphemes and one or more candidate words corresponding to each of the selected leading morphemes;
calculating a second string metric between each of the selected trailing morphemes and one or more candidate words corresponding to each of the selected trailing morphemes;
selecting each of the leading candidate words and each of the trailing candidate words, wherein the leading candidate words correspond to the leading morpheme and the trailing candidate words correspond to the trailing morpheme;
scoring a plurality of possible definitions of the identified portmanteau by combining a first definition retrieved for each of the selected leading candidate words with a second definition retrieved for each of the selected trailing candidate words; and
further scoring the plurality of possible definitions based on a contextual usage score based on comparing the possible definitions with a contextual usage of the identified portmanteau in the electronic documents, wherein the combined usage is based on a combination of the first and second string metrics corresponding to each of the leading and trailing morphemes and the scored possible definition of the leading candidate words and the trailing candidate words corresponding to the respective leading and trailing morphemes.

17. A computer program product stored in a computer readable storage medium, comprising computer program code that, when executed by an information handling system, causes the information handling system to perform actions comprising:
analyzing a plurality of words included in a plurality of electronic documents, wherein the analysis identifies at least one of the plurality of words as being a portmanteau that is not currently stored in a dictionary utilized by a question answering (QA) system;
identifying a plurality of morphemes included in the identified portmanteau and one or more candidate words that correspond to each of the identified morphemes, wherein each of the candidate words has a candidate word definition;
deriving a definition for the identified portmanteau, wherein the deriving comprises creating the definition by combining at least two of the candidate word definitions; and
storing the identified portmanteau and the derived portmanteau definition in the dictionary utilized by the QA system, wherein the QA system utilizes the derived portmanteau definition to understand and answer one or more questions corresponding to the identified portmanteau.

18. The computer program product of claim 17 wherein the actions further comprise:
from the plurality of morphemes, selecting a leading morpheme that corresponds to a first portion of the identified portmanteau and a trailing morpheme that corresponds to a second portion of the identified portmanteau; and
analyzing a combined usage of the leading and trailing morphemes, wherein the derived portmanteau definition is based on the combined usage.

19. The computer program product of claim 18 wherein the actions further comprise:
calculating a first string metric between the leading morpheme and the candidate word corresponding to the leading morpheme;
calculating a second string metric between the trailing morpheme and the candidate word corresponding to the trailing morpheme; and
combining the first and second string metric, wherein the combined usage is based on the combination of the first and second string metric.

20. The computer program product of claim 18 wherein the actions further comprise:
selecting a leading candidate word from the plurality of candidate words, wherein the leading candidate word corresponds to the leading morpheme;
selecting a trailing candidate word from the plurality of candidate words, wherein the trailing candidate word corresponds to the trailing morpheme; and
generating a possible definition of the identified portmanteau by combining a first definition that corresponds to the leading candidate word with a second definition that corresponds to the trailing candidate word, wherein the combined usage is based on the generated possible definition.

* * * * *